(12) United States Patent
Baechle

(10) Patent No.: US 6,199,958 B1
(45) Date of Patent: Mar. 13, 2001

(54) HYDRAULIC UNIT

(75) Inventor: Martin Baechle, Glashütten (DE)

(73) Assignee: Continental Teves AG & Co., OHG (DE)

( * ) Notice: Subject to any disclaimer, the term of this patent is extended or adjusted under 35 U.S.C. 154(b) by 0 days.

(21) Appl. No.: 09/341,281

(22) PCT Filed: Dec. 17, 1997

(86) PCT No.: PCT/EP97/07078

§ 371 Date: Sep. 29, 1999

§ 102(e) Date: Sep. 29, 1999

(87) PCT Pub. No.: WO98/30425

PCT Pub. Date: Jul. 16, 1998

(30) Foreign Application Priority Data

Jan. 9, 1997 (DE) ............................................. 197 00 410

(51) Int. Cl.⁷ .................................................. B60T 13/16
(52) U.S. Cl. ...................... 303/10; 303/113.1; 303/116.4; 188/352; 60/584; 141/59
(58) Field of Search ............................. 303/113.1, 113.5, 303/10, 84.1, 84.2, 115.1, 115.4, 115.5, 116.1, 116.4, 119.1; 188/352; 60/584; 141/59, 98, 65

(56) References Cited

U.S. PATENT DOCUMENTS

| 5,299,858 | | 4/1994 | Beck . |
| 5,505,529 | | 4/1996 | Siegle et al. . |
| 5,605,384 | * | 2/1997 | Johnston et al. ................... 303/113.1 |
| 5,944,068 | * | 8/1999 | Hool ...................................... 141/65 |

FOREIGN PATENT DOCUMENTS

| 44 46 525 | 6/1996 | (DE) . |
| 0 323 889 | 7/1989 | (EP) . |
| 0 482 367 | 4/1992 | (EP) . |
| 0 543 187 | 9/1996 | (EP) . |
| 7-165046 | 10/1995 | (JP) . |

* cited by examiner

Primary Examiner—Robert J. Oberleitner
Assistant Examiner—Pamela J. Rodriquez
(74) Attorney, Agent, or Firm—Rader, Fishman & Grauer PLLC

(57) ABSTRACT

The present invention relates to a hydraulic unit for an automotive vehicle brake system according to the recirculation principle, wherein each brake system in the area of the hydraulic unit includes a prefilling location which opens into the pump suction conduit to take up brake fluid. Thus, filling of the hydraulic unit can be simplified by prefilling of the secondary circuit in the vehicle.

3 Claims, 1 Drawing Sheet

HYDRAULIC UNIT

TECHNICAL FIELD

The present invention relates to a hydraulic unit system and more particularly relates to a process of prefilling a hydraulic unit with brake fluid.

BACKGROUND OF THE INVENTION

Hydraulic units of the above-mentioned type are supplied to the vehicle maker either prefilled, or in a condition not filled with brake fluid. Because the wheel outlet valves in automotive vehicle brake systems operating according to the recirculation principle lead into so-called secondary circuits which correspond to the pump suction conduit with a low-pressure accumulator connected thereto, special bleeding and filling provisions are necessary in order to protect also the electrically and hydraulically operable valves which are isolated in the area of the secondary circuit against air inclusions, and to fill them with brake fluid in an operationally reliable manner.

In this respect, it is an advantage for the vehicle maker that the filling operation of the entire brake circuit is exclusively restricted to the primary circuit, i.e., the hydraulic area between the braking pressure generator and the pressure fluid connection which is open in the direction of the wheel brake. Therefore, the manufacturers of brake systems frequently supply the basic function components integrated in a hydraulic unit to vehicle makers in a prefilled condition.

Generic European patent application No. 0 482 367 discloses a hydraulic unit for an automotive vehicle brake system which operates according to the recirculation principle. The hydraulic unit is connected to a pump assembly by way of a connecting line. To fill the hydraulic unit with brake fluid, a feed bore is arranged on the hydraulic unit which opens into the connecting line upstream of a pair of non-return valves that close in the direction of the pump assembly. From the feed bore, the brake fluid propagates by way of one of the two non-return valves up to a portion of a suction conduit of the return pump which is isolated from the outlet valves by a non-return valve. Ports of the hydraulic unit lead from the outlet valves to several wheel brakes. Consequently, the portion of the suction conduit which is positioned between the outlet valves and the non-return valve that is downstream of the return pump cannot be prefilled through the feed hole.

An object of the present invention is to prepare a hydraulic unit of the above indicated type already to such effect that a most simple prefilling of the hydraulic unit is achieved by least possible structural and functional efforts.

According to the present invention, this object is achieved for a hydraulic unit of the above-mentioned type by an appropriate process of prefilling the hydraulic unit.

DETAILED DESCRIPTION OF THE PREFERRED EMBODIMENTS

Figure 1:
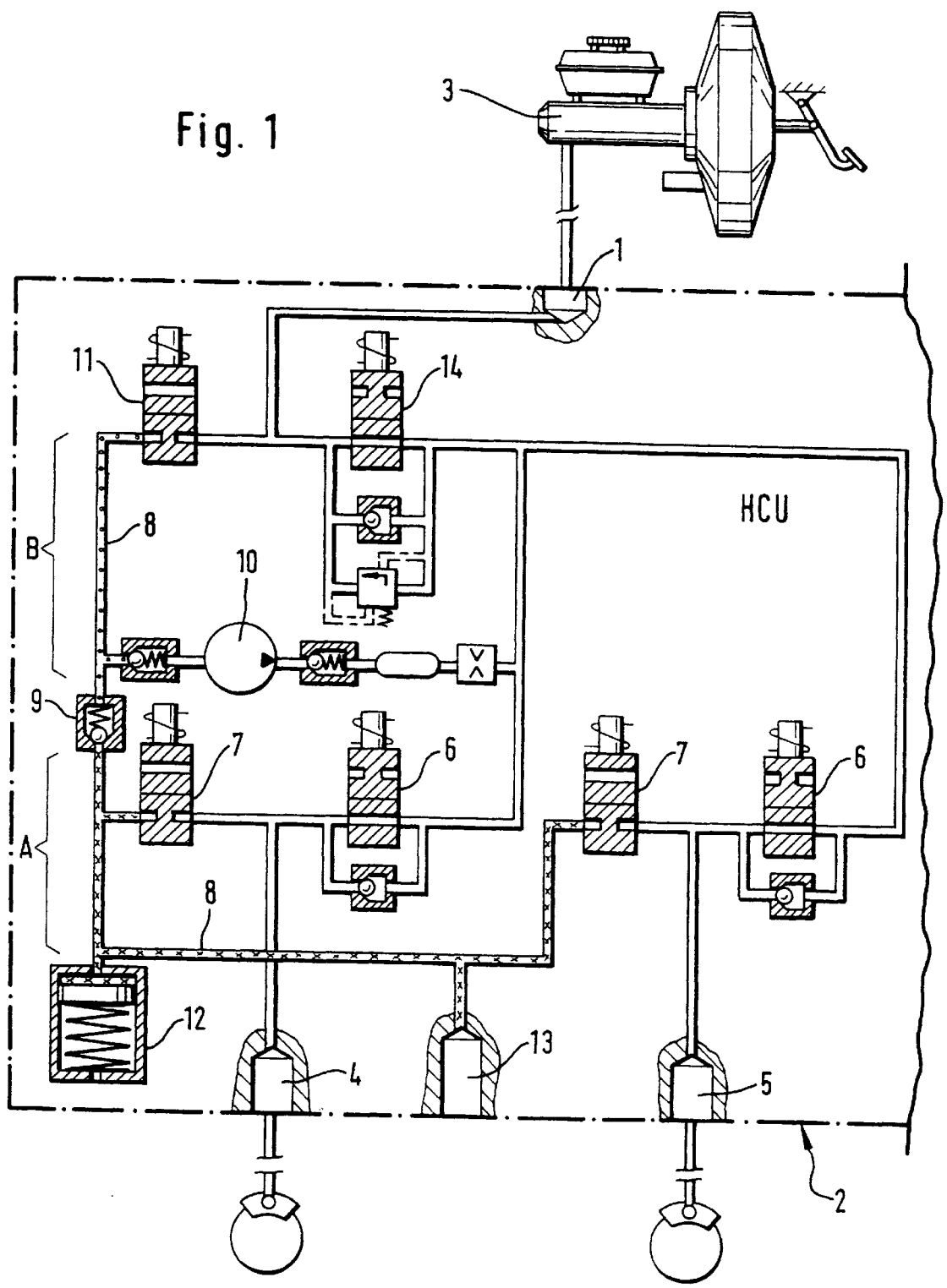
FIG. 1 shows a basic view of the circuit structure within a hydraulic unit for an automotive vehicle brake system operating according to the recirculation principle.

Only one exemplary brake circuit of a circuitry arrangement which is normally configured as dual-circuit brake circuit is shown herein; however the present invention is applicable to many types of brake circuits. A first port 1 on the hydraulic unit 2 leads to a braking pressure generator 3, and the first port 1 within the hydraulic unit 2 extends to further second and third ports 4, 5 by way of several pressure control valves of each brake circuit which are illustrated at least sectionwise in the hydraulic unit 2. Ports 4, 5 are in connection with a pair of wheel brakes. Associated with each wheel brake within the hydraulic unit 2 are inlet and outlet valves 6, 7. Connected downstream of the outlet valves 7 of each brake circuit is a pump suction conduit 8 which is separated from a pump 10 by way of a pressure-retaining valve 9, on the one hand, and from the braking pressure generator 3 by a change-over valve 11 which is closed in the initial position, on the other hand. Thus, the pump suction conduit 8 is subdivided by the pressure-retaining valve 9 into two so-called dead spaces A, B. The dead space A which extends between the pressure-retaining valve 9 and the outlet valve 7 is increased by the dead space of the low-pressure accumulator 12. The two dead spaces A, B along with the dead space of the low-pressure accumulator 12 form the so-called secondary circuit of the brake system which is provided for each individual brake circuit. To take up brake fluid in the secondary circuit and, thus, in the area of the pump suction conduit 8, according to the present invention, each brake circuit has a prefilling location 13 which, after evacuation of the secondary circuit, permits prefilling of the secondary circuit so that after subsequent completion of the hydraulic unit by way of the three ports 1, 4, 5 on the wheel brakes and on the braking pressure generator 3, it is exclusively required to fill the so-called primary circuit at the vehicle makers' premises. This obviates the need to switch the outlet valves 7 during the filling operation. This is because in the present configuration of the pressure control valves, the inlet valves 6 and the electromagnetic valve 14 that is configured as a separating valve for traction slip control are open in their deenergized initial position. Thus, the illustrated valve connection for a brake circuit corresponds in terms of use of the electromagnetic valve 14 and in connection with the arrangement of the electrically operable change-over valve 11 to a brake system which is suited not only for anti-lock control but also for operation with traction slip control and driving dynamics control. Accordingly, the brake system shown in the drawing corresponds in all basic elements to the brake system disclosed in German patent application No. 44 46 525.

Apart from the design of the brake system illustrated in its essence hereinabove, the method of the present invention of prefilling the hydraulic unit 2 with brake fluid will be referred to in the following. The present invention teaches that exclusively the area of the pump suction conduit 8 and, thus, the so-called secondary circuit is filled with brake fluid before the hydraulic connection between the hydraulic unit 2 and the wheel brakes and the braking pressure generator 3 is established. This is done according to the subsequent process steps, preferably as follows:

1. Two pressure fluid ports of the three pressure fluid ports 1, 4, 5 of a brake circuit, as shown in the drawing, are closed so as to be pressure-fluid tight.
2. Vacuum, preferably, high vacuum, is generated at the prefilling location 13.
3. The change-over valve 11 which is closed in its initial position and normally isolates the pump suction conduit 8 from the braking pressure generator 3 is switched electromagnetically to assume its open position.
4. Both dead space areas A, B are bled quickly and thoroughly either by way of one of the wheel ports 4, 5 or by way of port 1 to the braking pressure generator 3 because a vacuum port is quasi effective on either side of the pressure-retaining valve 9.

The further process steps envisaged are as follows:

5. The changeover valve 11 is reset to its closed initial position.
6. The vacuum in the brake circuit disposed within the hydraulic unit 2 is exposed to the atmospheric pressure by opening of the three pressure fluid ports 1, 4, 5.
7. The vacuum of the secondary circuit prevailing at the prefilling location 13 is acted upon and filled with the pressure of a brake fluid being introduced into the hydraulic unit, and the pressure of the brake fluid is rated so high that the fluid is able to open the pressure-retaining valve 9 which opens in the direction of the change-over valve 11, but unable to open the change-over valve 11.

The result in practical operations is that the vacuum at the prefilling location 13 is replaced by an absolute pressure of the brake fluid of 1.5 bar approximately. Initially, the dead space A is filled with brake fluid until the pressure on the pressure-retaining valve 9 exceeds the opening pressure of roughly 0.2 to 0.9 bar so that now the brake fluid, by way of the open pressure-retaining valve 9, fills the dead space B until the filling pressure of 1.5 bar is reached. Because the filling pressure is lower than the hydraulic opening pressure of the change-over valve 11, the pressure compressed between the pressure-retaining valve 9 and the change-over valve 11 continues to adopt the value of 1.5 bar approximately, and the dead space A between the pressure-retaining valve 9 and the outlet valves 7 remains prefilled with brake fluid and at atmospheric pressure after a prefilling device is removed and the prefilling location 13 has been closed.

What is claimed is:

1. Hydraulic unit for an automotive vehicle brake system comprising:

a first port on the hydraulic unit that leads to a braking pressure generator, pressure control valves configured as inlet and outlet valves in a brake circuit that is provided at least in part in the hydraulic unit, wherein said brake circuit is connected to at least one pair of wheel brakes by way of a second and a third port of said hydraulic unit, a low-pressure accumulator arranged in the hydraulic unit downstream of the outlet valves, a pump suction conduit arranged in the hydraulic unit downstream of the outlet valves which is separated from a pump by way of a pressure-retaining valve from the first port leading to the braking pressure generator by a change-over valve which is closed in the initial position, wherein the brake circuit includes a prefilling location which opens into the pump suction conduit between the outlet valves and the pressure-retaining valve to take up brake fluid.

2. Process of prefilling a hydraulic unit as claimed in claim 1, wherein exclusively the area of the pump suction conduit disposed between the outlet valves and the pressure-retaining valve is filled with brake fluid via the prefilling location before the hydraulic unit is connected hydraulically to the wheel brakes and the braking pressure generator.

3. A method of prefilling a hydraulic unit comprising the steps of:

closing two of three pressure fluid ports on a hydraulic unit, wherein two of which are connected to a pair of wheel brakes and one to a braking pressure generator;

generating a vacuum at a prefilling location which is connected to a pump suction conduit between outlet valves and a pressure-retaining valve to take up brake fluid;

switching a change-over valve, which is closed in its initial position and normally isolates the pump suction conduit from the braking pressure generator is switched, to assume an open position for bleeding the portion of the pump suction conduit which is isolated from the pressure-retaining valve;

applying a vacuum to the first port which is not closed;

resetting said changeover valve to a closed initial position after the desired vacuum has been adjusted;

ventilating the brake circuit between the outlet valves, the changeover valve, and the prefilling location to atmosphere by opening of the three pressure fluid ports;

introducing pressurized brake fluid into the hydraulic unit, wherein the pressure of the brake fluid is rated sufficiently high such that it is able to open the pressure-retaining valve which opens in the direction of the change-over valve, but not sufficiently high to open the change-over valve;

closing the prefilling location after the prefilling operation is completed.

\* \* \* \* \*